United States Patent [19]

Gerry

[11] 4,377,968

[45] Mar. 29, 1983

[54] FLUID FLOW CONTROL MEANS

[76] Inventor: Ulric K. Gerry, 56, Beverley Gardens, Wembley, Middlesex, England

[21] Appl. No.: 223,324

[22] Filed: Jan. 8, 1981

[30] Foreign Application Priority Data

Jan. 10, 1980 [GB] United Kingdom ............... 8000780

[51] Int. Cl.³ ............................................. F24F 13/10
[52] U.S. Cl. ..................................... 98/41 R; 98/95; 138/46; 137/521; 251/DIG. 2
[58] Field of Search ..................... 98/41 R, 77, 85, 95, 98/119; 251/DIG. 2; 137/517, 521, 855; 138/45, 46; 160/40

[56] References Cited

U.S. PATENT DOCUMENTS

| | | | |
|---|---|---|---|
| 1,083,289 | 1/1914 | Alexanderson | 138/46 X |
| 1,119,288 | 12/1914 | Kurz | 98/95 |
| 1,672,496 | 6/1928 | McFarland | 98/41 R X |
| 2,890,717 | 6/1959 | Werder | 98/41 R X |
| 3,049,146 | 8/1962 | Hayes | 251/DIG. 2 |
| 3,180,363 | 4/1965 | Knarbakk | 98/41 R X |
| 3,301,168 | 1/1967 | Schindler et al. | 137/517 X |

FOREIGN PATENT DOCUMENTS 598066  5/1960  Canada ............................... 137/521

Primary Examiner—William E. Tapolcai
Attorney, Agent, or Firm—Brisebois & Kruger

[57] ABSTRACT

The present invention relates to an arrangement for controlling fluid flow through an aperture.

In one embodiment, the flow control arrangement, which may be used in association with a window to control the flow of ventilating air, comprises a strip brush composed of an array of resilient filaments firmly mounted at their root region. The free end region of the filaments define, with a fixed flange, the effective area or width of an aperture for the passage of ventilating air. Variations in the strength of the air flow incident to the array of filaments causes changes in the degree of deflection of the filaments, thus altering the effective width of the aperture and controlling the air flow through the aperture.

23 Claims, 47 Drawing Figures

FLUID FLOW CONTROL MEANS

This invention relates to means for controlling the flow of fluids in ducts, flues, passageways and other open or closed channels, through orifices, openings and apertures in general, in circumstances in which it may be desirable to control the said flow in, for example, quantity or direction, or in other relevant fashion.

The invention may be applied in circumstances where a low pressure non-return valve is required, or for replacing manually or mechanically operated valves, shutters or the like where this operation may be done by the action of the working fluid itself; it may find application in ventilating systems where, for example, it is desirable to limit the flow generated by a fluctuating head of pressure or to prevent flow reversal; it can be used in systems employings fans, pumps or other fluid impellers for restricting reversed flow when one or more of the impellers is inoperative: it can be used to control flows in interconnecting passages in underground or ducted haulageways or railway tunnel systems; it can be adapted for use in moving vehicles to control a flow of fluid, for example for cooling purposes, which might otherwise vary in quantity beyond desirable limits with changes in vehicle speed; it can replace, or be used in association with pressure relief devices, such as blast doors in mine ventilation systems; it can be adapted so as to allow the passage of one fluid but to prevent that of another, for example to permit the passage of air but not that of water; but it is not limited to these employments. It may also have secondary uses such as affording a degree of filtration, noise damping or flow deflection.

It may have advantages over devices currently employed in the above situations by reason of its simplicity, adaptability, robustness, cheapness or its fundamental lack of moving parts in the conventional sense.

Accordingly, the present invention consists in fluid flow control means comprising an array of resilient filaments firmly held at one end region with the other free to deflect under the action of a working fluid, the density of the packing of the filaments being sufficient to prevent the ready passage of the fluid between them and the said array being so mounted in relation to a structure such that the combined deflection of the separate filaments under fluid action alters an effective area available for the passage of the said fluid such that the movement of the fluid is controlled in a desired manner. One or more arrays may be employed in a given installation and the effective area of passage may be rectangular, square, circular or of other convenient shape.

From one aspect the present invention consists in means for controlling fluid flow through an aperture characterised by a plurality of resilient filaments which are held at one end region thereof, leaving the other end region free to respond to the flow of fluid in said aperture. The invention may be further characterised by the provision of associated structure which determines the effective or working size of aperture during the progressive deflection of the filaments, and yet further by the provision of means for limiting the possible deflection of the filaments under fluid action.

The action of an array of filaments deflecting under fluid action may be compared with that of a single piece of material of corresponding resilience and projected area, such as might be provided by a sheet of firm rubber or plastics. Unless special material is chosen and careful tapering of the cross-section is adopted a single piece will tend to flex along a particular line near the held end or side. This flexure line will be readily subject to fatigue and to change in flexure properties. When in due course a tear develops, a stress concentration will be produced which will encourage the extension of the tear. Further since one side of the strip is held firmly it is difficult for the whole piece to respond to the stretching or changing in shape of the free side which can take place due to differential deflection, thermal, aging or work-hardening or other effects. These changes along the span of the free side cannot readily be followed by the held end and thus can produce wrinkles or other distortions of the free side. This will alter the stiffness of the whole piece and prevent ready closure of the aperture at a chosen fluid loading. Yet further, if a foreign body becomes lodged in the aperture, a considerable part of the span of a single piece may be prevented from responding to fluid action. By comparison the filamentatious array suffers from none of these deficiencies, either not at all, or only to a minor degree.

The array of resilient filaments may conveniently be provided, for example, by any of the known means used for the manufacture of strip brushes, and the material for the filaments chosen with regard to flexibility, resilience, length, diameter and other properties, such as durability and thermal changes, so as to deflect under fluid action and recover their original position when unloaded and to perform their function in a desired and acceptable manner. In a frequently employed means for the manufacture of strip brushes, appropriate lengths of filament are folded at the mid points around a wire or other continuous core and then clamped in a metal U-channel. Such a construction provides filaments which are effectively held at one end region with the other free to deflect, for the purposes of the present invention. For the sake of convenience such a construction is assumed in the further description without intending to exclude alternatives.

The invention will now be clarified by reference to the accompanying drawings in which:

FIGS. 8a–c show forms of the device installed in a duct; FIG. 8c being in the form of a self-adjusting louvre system.

FIGS. 9a–d show four embodiments of the device adapted to be fitted above a window or panel.

All the figures show examples in cross-section, the span of the device being determined by the specific requirements and restraints of each case.

Figure 1A:
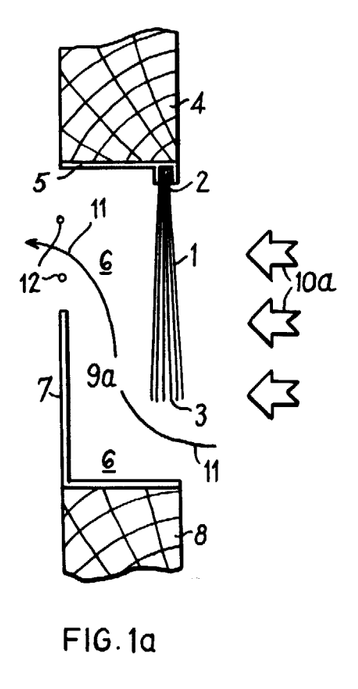
FIGS. 1a–c show a basic form of the invention and the manner in which it responds to increasing fluid loading.
Figure 1B:
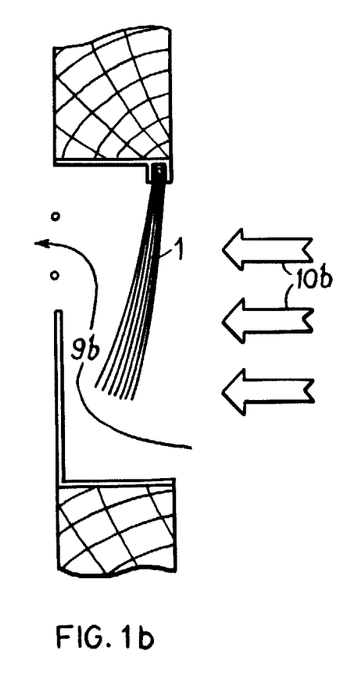
Figure 1C:
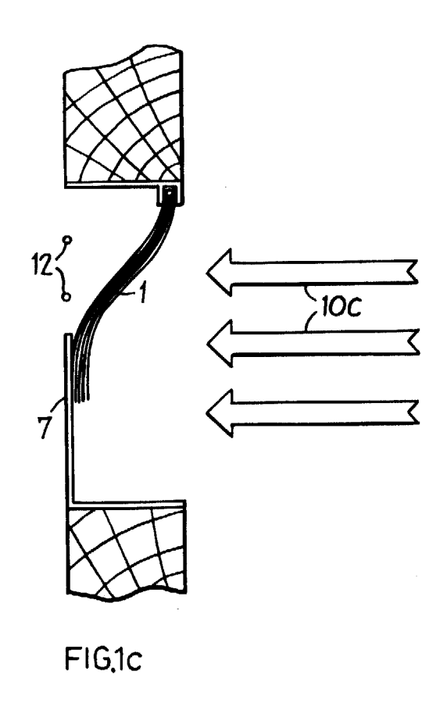

In FIG. 1a the filaments 1 are firmly held at their upper ends 2 with their lower ends 3 free to move. The mounting of the upper ends to a base structure 4 is effected by means of a suitable extruded section 5, the section being in a metal such as aluminum, or in plastics. The filaments extend partly across an aperture 6 which is further defined by a raised flange 7 mounted on the lower part of a base structure 8, and this said flange determines the effective width 9a available for fluid movement. The incident flow of fluid is from the direction of the broad arrows 10 and the movement of the fluid through the passage provided by the device is indicated by the fine arrows 11. Wires 12 stretched across the span of the aperture above the flange 7 (supported at intervals as necessary) prevent the passage of unwanted bodies, such as blown paper or leaves, or birds or other creatures. In FIG. 1b the same filaments 1 are exposed to a stronger incident flow of fluid and suffer a higher fluid loading than in FIG. 1a, as indicated by the greater length of the broad arrows 10b. The effective width 9b available for the passage of fluid is reduced by the deflection of the filaments. In FIG. 1c the yet stronger incident flow indicated by arrows 10c is sufficient to force the filaments 1 back against the flange 7 thus preventing the free passage of fluid through the device. Should the incident fluid loading rise still higher, the wires 12 additionally prevent the filaments from being driven back over the top of the flange 7.

Figure 2A:
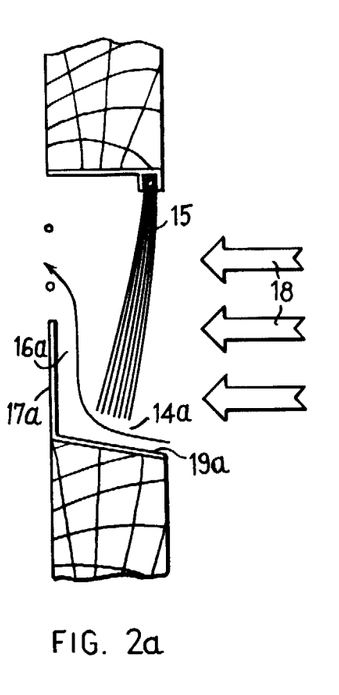
FIGS. 2a–c show how the form of the free passage area beneath the tips of the filaments may determine the response of the device to a given fluid loading.
Figure 2B:
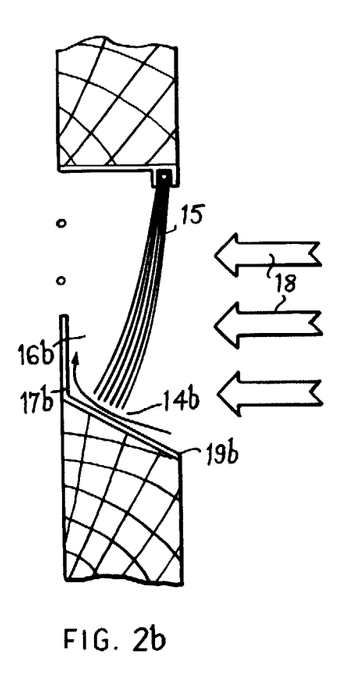
Figure 2C:
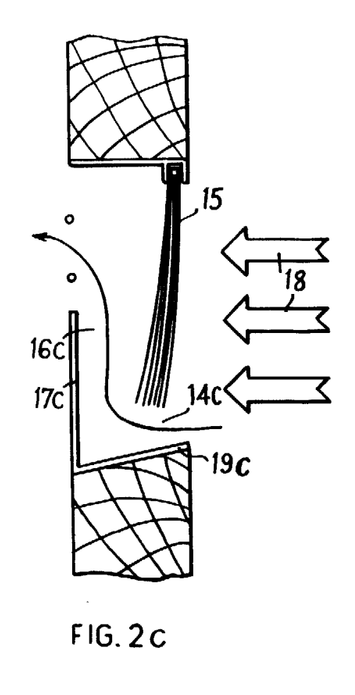

In FIGS. 2a–c the examples are distinguished from the foregoing by the passage width 14a–c beneath the tips of the filaments 15 being substantially less than the passage width 16a–c behind the filaments, at least in the undeflected position. The area available for the free flow is thus determined during the initial stages of deflection by the passages 14a–c rather than the passages 16a–c. Only when the filaments begin to approach the rear flanges 17a–c does the latter passage become critical. The fluid permitted to pass in each example due to the same incident flow strength, indicated by the uniform arrows 18, can be regulated by the slope of the surface 19a–c beneath the tips of the filaments. In FIG. 2a the slope of the surface 19a is such that the passage width 14a is roughly constant until the flange 17a is approached. In FIG. 2b the passage width decreases rapidly beneath the filament tips as they deflect and in FIG. 2c the width 14c increases. Thus for a given initial opening not only can the permitted through flow for a given incident flow be fixed, but the response characteristics over the range of permitted flows may be varied. The examples are not limited to the form of FIGS. 2a–c and the line of the surface 19a–c is not limited to being straight.

Figure 3A:
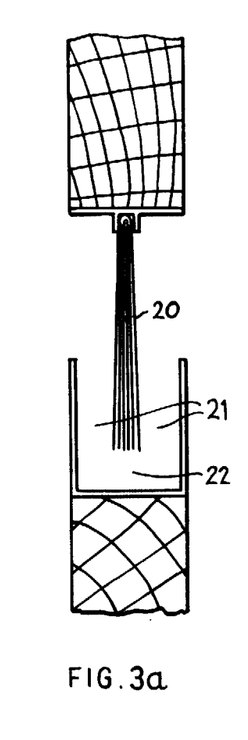
FIGS. 3a–d show alternative forms of the device which may be subjected to fluid loading from either side.
Figure 3B:
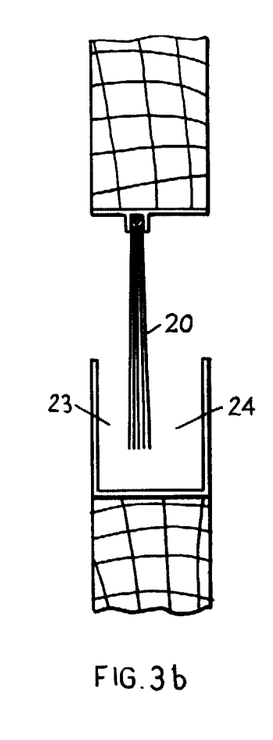
Figure 3C:
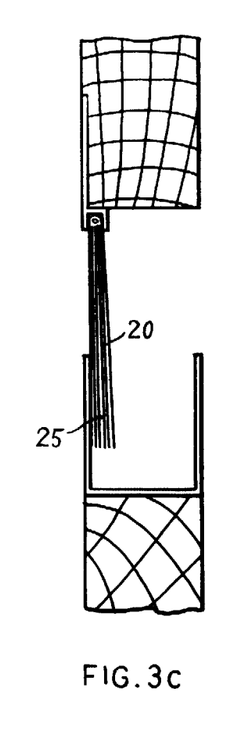
Figure 3D:
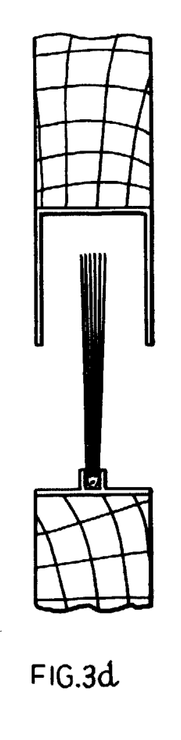

In the foregoing examples the device is primarily intended to control flow from the direction of the broad arrows 10a–c or 18. Flow from the opposite direction, if any, suffers increasing freedom rather than restraint. In FIGS. 3a–d forms are shown which deal with flow from either direction. In FIG. 3a an array of filaments 20 is shown mounted symmetrically above a U-channel leaving a free area 21 on either side and beneath 22. The device may be activated by flow from either side and will perform broadly according to the foregoing descriptions. In FIG. 3b the filaments are offset so that the passage areas 23 and 24 are dissimilar and the device will respond differentially according to the direction of incident flow. FIG. 3c shows an extreme example of the previous one in which the filaments 20 are mounted so as to touch one flange 25 of the U-channel. In this arrangement all free flow is prevented in one direction, the device only deflecting with the flow in the other. FIG. 3d shows an inverted example of FIG. 3a, which might be employed to keep the U-channel clear of water for example. An alternative way of achieving this in the case of FIGS. 3a–c is to provide drain holes on the most convenient side.

Figure 4A:
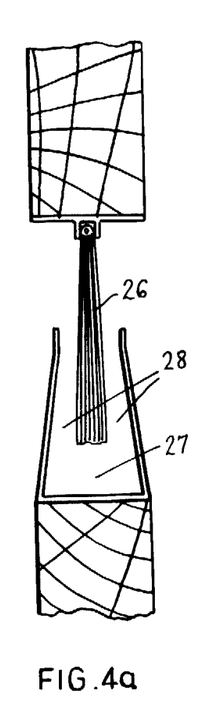
FIGS. 4a–b illustrate 'side pressure' and 'tip flow' response forms.
Figure 4B:
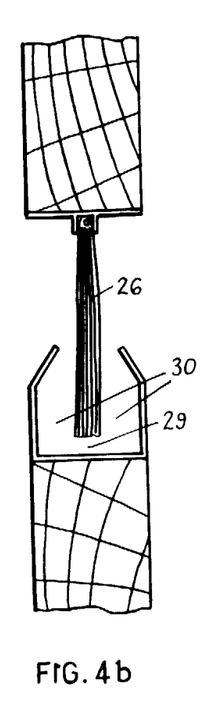

In FIGS. 4a and 4b the distinction is brought out between two manners in which filaments 26 may respond to fluid affects. In FIG. 4a there is a relatively wide passage 27 beneath the tips of the filaments and relatively narrow passages 28 along their sides. In FIG. 4b there is a small clearance 29 beneath the tips and wider spaces 30 either side of them. The deflection of the filaments in FIG. 4a will be augmented by the pressure differential in the passages produced by the different velocities as one passage widens and the other narrows, but it will be helped only a little by the direct action of the fluid on the tips of the filaments. By contrast in the example of FIG. 4b the direct action of the fluid on the tips will be greater and the differential effect of the pressures in the wider spaces 30 will be less. These manners of response are not exclusive and examples may be found in which both are employed.

Figure 5A:
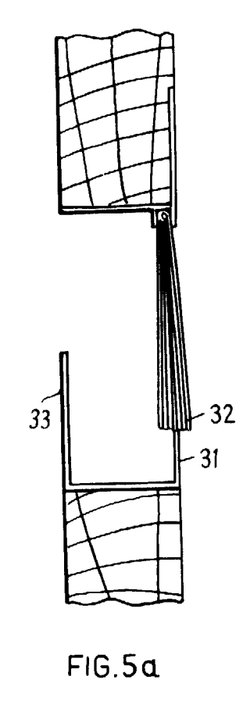
FIGS. 5a–b show forms that are closed in zero loading conditions.
Figure 5B:
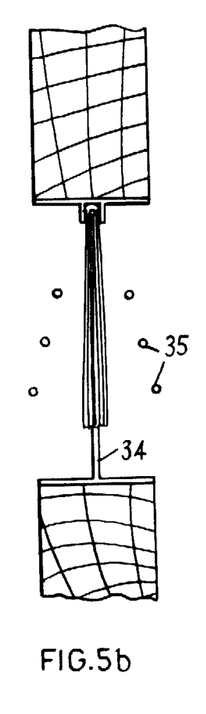

FIGS. 5a and 5b show two forms which are closed by the tips of the filaments in zero flow conditions. FIG. 5a is similar to FIG. 1a except that a small upstanding flange 31 is added immediately beneath the tips 32 of the filaments. Once exposed to a significant incident flow the device will respond much as the examples of FIGS. 1a–c. FIG. 5b shows a special case of FIG. 5a in which the main flange 33 of FIG. 5a is eliminated and a single centrally placed small flange 34 is provided. The device allows increasingly free flow in either direction with increasing fluid loading while remaining closed in zero or negligible incident flow. Arrangements such as shown in FIGS. 5a and 5b may be employed where it is desired, for example, to prevent convective flow of undesirably warm or cold air from entering a building or the entry of such insects as only move readily in low wind conditions, while providing ventilation when freely moving air is available. The free opening of either example may be restrained by wires 35 such as are shown in FIG. 5b.

Figure 6A:
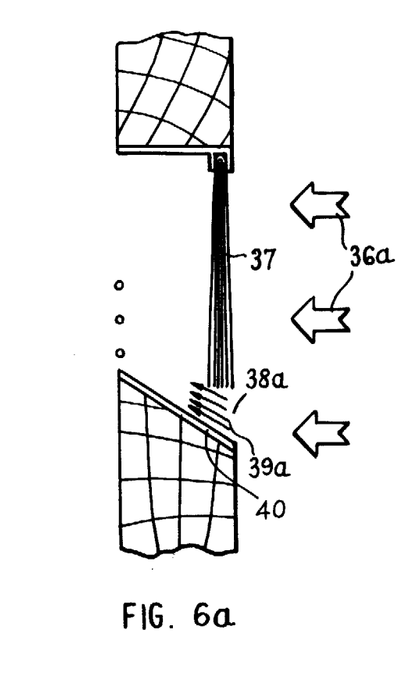
FIGS. 6a–c show a form which gives approximately constant through-flow over a range of flow loading conditions.
Figure 6B:
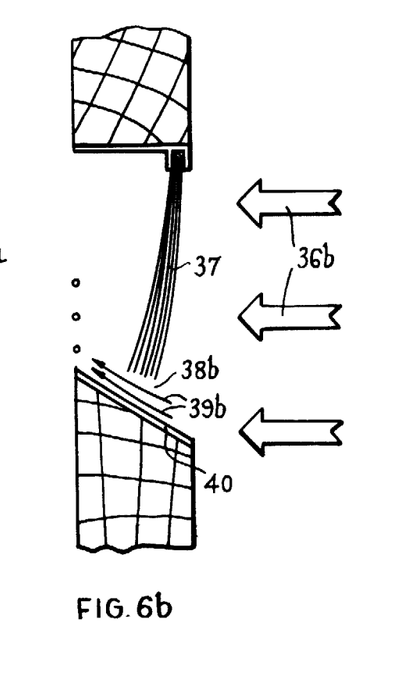
Figure 6C:
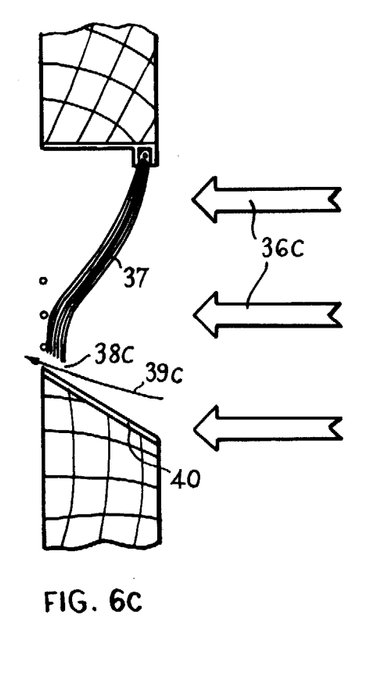

In FIGS. 6a–c an arrangement which gives constant through-flow for a finite range of approach flows is shown. Such a range of flow might be provided by a forced ventilation system in which the number of extraction points may be varied. With all extraction points working the head available at any one will be a minimum as shown by the short broad arrows 36a in FIG. 6a, where there is virtually no deflection of the filaments 37, and the gap 38a beneath them is sufficient to permit the required flow, as indicated by the fine arrows 39. When a number of outlet points are closed the head may rise to provide an approach flow of a strength indicated by the longer broad arrows 36b, so that the filaments deflect and reduce the gap 38b. The slope of the surface 40 is chosen such that the deflection of the filaments under this head will close the available passage to the extent that the same quantity of flow is maintained through the smaller area. When only one extraction point remains open the head rises to the level indicated by the broad arrows 36c and the filaments are deflected as shown in FIG. 6c. The remaining narrow gap 38c through which the flow passes with a velocity indicated by the single fine arrow 39c is no larger than is necessary to permit the same quantity of fluid to pass as previously. In this example, as in previous ones, multiple units constructed conjointly may be employed where a single span of the device is insufficient to pass the total required flow.

Foregoing examples of the device may be made adjustable in operation by making parts of the arrangement moveable. For example, if the mounting for the filaments in FIG. 1a or FIG. 3a is hinged the position of the filaments may be adjusted relative to the relevant flanges. Alternatively by way of further example the flange of FIG. 1a or the U-channel of FIG. 3a may be slideably mounted so that it can move transversely to the approaching flow, so that the gap available for the passage of fluid at any given head may be adjusted. Known means for effecting the necessary movements may be employed.

Figure 7A:
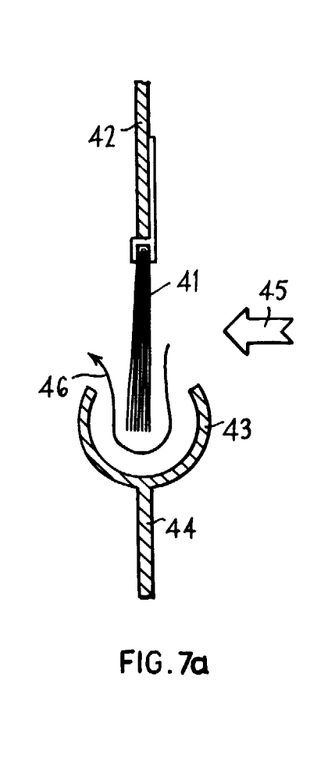
FIG. 7a shows a particular construction and FIGS. 7b–c show an adaptation to make it adjustable.
Figure 7B:
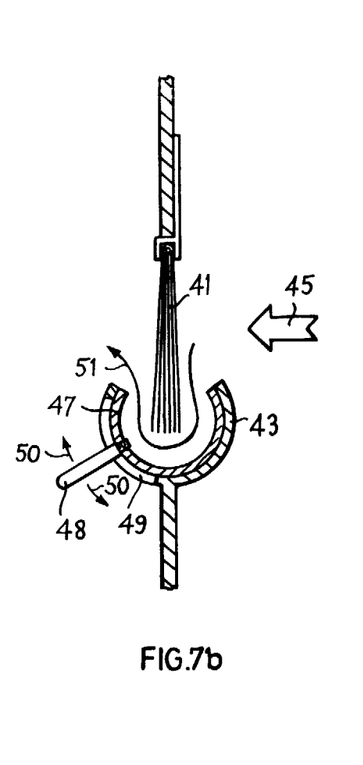
Figure 7C:
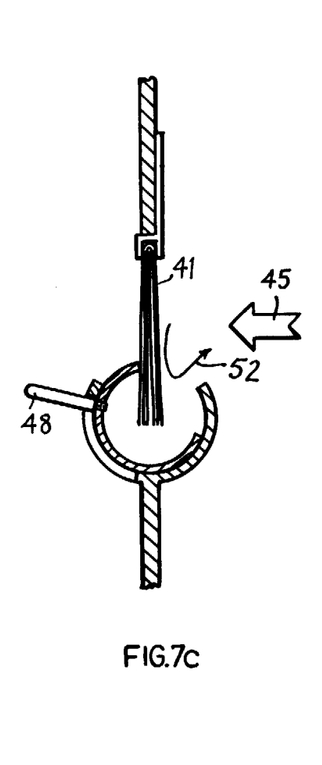

In FIG. 7a a particular embodiment is shown for the device, and in FIGS. 7b and 7c a means for making it adjustable is illustrated. An array of filaments 41 is mounted on a structure member 42 with the free ends of the filaments projecting downwards into a part circular channel 43 which in turn is mounted on or is integral with a further structure member 44. The approach flow is indicated by the broad arrow 45 and the passage of the fluid through the device is shown by the fine arrows 46. The action of the device under varying incident flow may be understood from previous examples.

In FIG. 7b a part circular liner 47 has been added inside the channel 43, fitted with a peg 48 which projects through a slot 49 in one side of the channel 43. Arrows 50 indicate the movement available for the peg in the slot, such movement altering the free passage area available for flow which, in the neutral position for the liner shown, is indicated by arrow 51. In FIG. 7c the peg 48 has been moved to one extreme position, thus bringing one edge of the liner into contact with the filaments 41 and so closing the passage available for flow, as is suggested by the arrow 52. Manual or mechanical means may be employed for moving the peg or its suitable alternative. Means may be provided for retaining the peg in a preferred position.

Figure 8A:
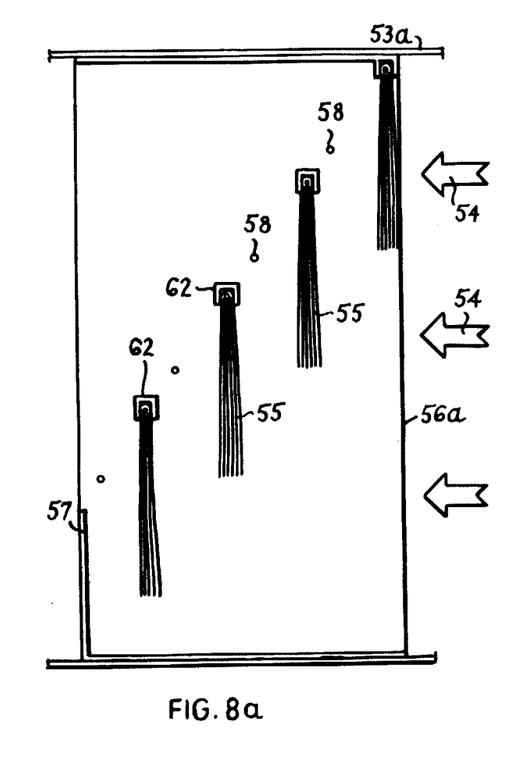
Figure 8B:
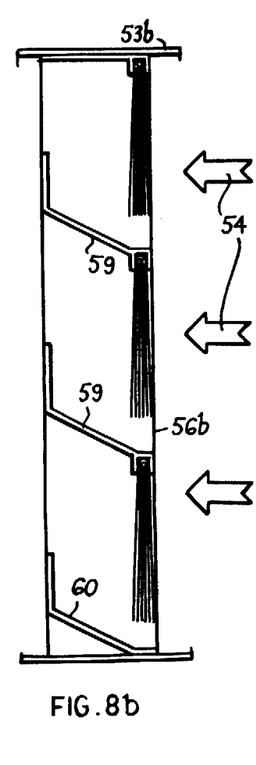
Figure 8C:
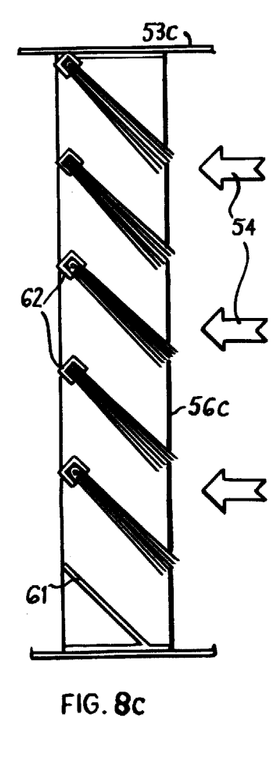

In FIGS. 8a-c three embodiments of multiple arrays are shown mounted in rectangular ducts 53a-c, with incident flow indicated by broad arrows 54. In FIG. 8a four arrays of filaments 55 are mounted diagonally across a substructure 56a which is inserted in the duct 53a. The upper three arrays close against the succeeding ones below as the incident flow increases, while the lowest is provided with a suitable flange 57 behind it. Wires 58 are provided to prevent excessive incident head from driving the filaments of one array over the top of the next. The diagonal arrangement allows a substantial total gap to be provided to accomodate the ready passage of low velocity flows.

FIG. 8b shows three arrays of shorter filaments set one above the other in substructure 56b set in a duct 53b. The filaments deflect above the sloping and flanged members 59 and 60. Members 59 are adapted to carry filament arrays beneath them. This arrangement is shorter in the direction of flow than that of FIG. 8a and permits the use of sloping surfaces to control the fluid motion in a more precise manner.

FIG. 8c shows five arrays of filaments mounted as louvres on a substructure 56c inserted in a duct 53c. Apart from the lowest, for which a sloping stop 61 is provided, each array closes on the one below it.

The substructure for these embodiments may conveniently be made in light alloy metal or in plastics and the U-section carrying members 62 into which the earlier mentioned U-channel of the actual filament arrays are fitted, or the member 59 may be of similar material. Mixed constructions of metal and the plastics may be employed. If the span of the arrays is sufficient to warrant it, intermediate support may be fitted, otherwise the arrays are fixed only on the substructure adjacent to the duct wall. Instead of inserting a substructure into a duct the device may be built directly into a section of duct.

The use of these three embodiments is not confined to ducts. The louvre arrangement of FIG. 8c may, for example, be used where other louvre systems might be employed. However where this arrangement is exposed to strong cross flow or up-draught it may be necessary to provide screening of other protection. Fly screens or vandal proofing means may be added.

Figure 9A:
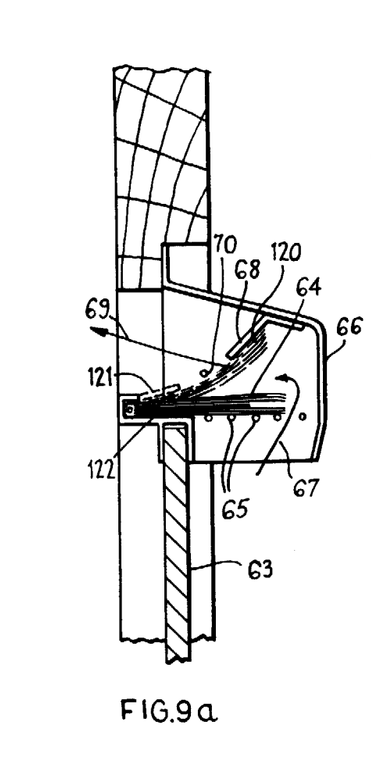
FIG. 9a shows permeability control means.

The forms in FIGS. 9a-d show some of the embodiments that, for example, may be used in association with windows, panels or the like, where fixed ventilation would permit a greater range of flow under wind action than would be acceptable and manual or other means for controlling or closing the aperture are not preferred. In FIG. 9a the device is mounted above a window 63 and the filaments 64 are set horizontally and rest on a wire screen or suitable grid 65. A cover 66 extending over the projecting filaments is open below to allow the inflow of air in the direction of the fine arrow 67. A flange 68 is mounted on the inside of the cover above the filaments to provide a stop against which the filaments can close. In light winds the filaments deflect little and the air passes beneath the flange as shown by the fine arrow 69. As the wind increases the filaments are progressively driven back to close against the flange and excessive inflow is prevented for the duration of high wind. The embodiment may be varied in a number of ways, for instance, by sloping the plane of the resting filaments away from the horizontal or by using a plurality of arrays of filaments, closely spaced if desired. One or more stop wires 70 may be fitted.

Figure 9B:
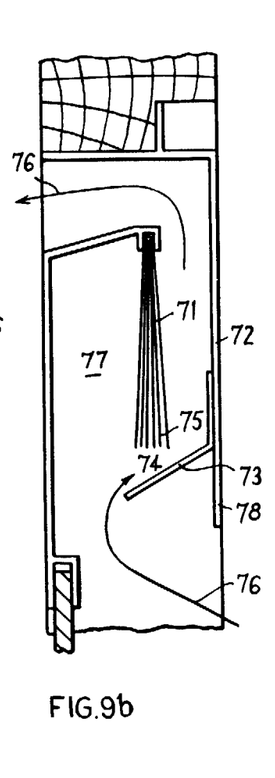

FIG. 9b shows an embodiment in which the filaments 71 are mounted behind a cover plate 72 which carries an internal flange 73, the latter defining a space 74 beneath the filament tips 75, the flange being set at an angle such that as the filaments deflect outwards under wind load towards the inside of the cover plate the space 74 available for the free passage of air decreases. The flow through the device follows the arrows 76. The pressure in the space 77 contributes to the deflection of the filaments which action is also supported by the direct affect of the flow on their tips.

If the flange 73 is produced by the bending back of the bottom edge 78 of the cover plate it may become particularly necessary to make provision against rain penetration.

Figure 9C:
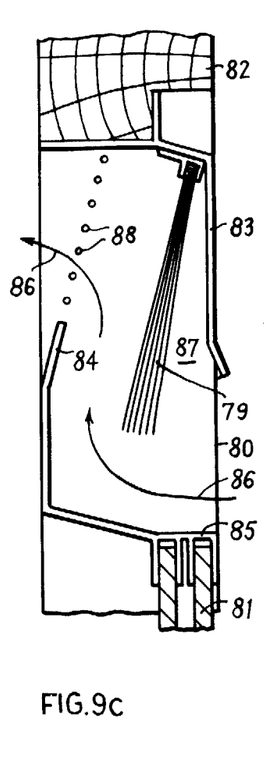

FIG. 9c shows a further embodiment in which the filaments 79 are set behind an opening 80 above a window 81 which lies flush with an exterior surface structure 82. A plate 83 partly protects the filaments which deflect under wind loading against the upper part of a rear member 84 which may be integral with or attached to the glazing member 85. The filaments are set at an angle to the vertical which helps to bring them away from the effects of external cross-flows and to establish a space 87 in which the built-up of pressure helps to deflect the filaments. A wire or other screen 88 may be added behind the filaments.

Figure 9D:
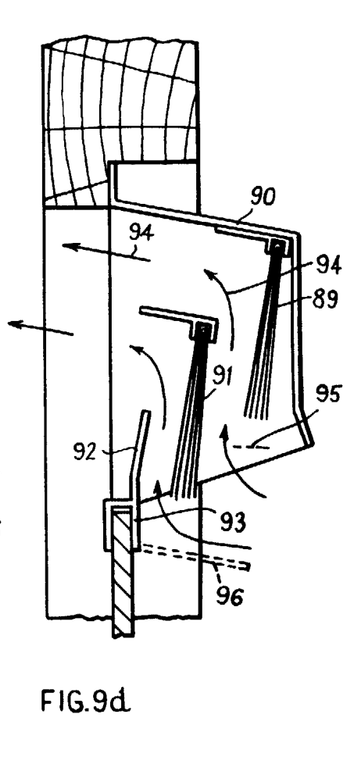

The embodiments shown in FIG. 9d include a pair of arrays of filaments, the upper array 89 being mounted directly on a cover 90 and closing against the lower array 91, which in turn closes against a flange 92, which is integral with a glazing member 93. The air follows the paths indicated by fine arrows 94. The lower array is mounted on the end covers, one of which 95 is shown, and may be supported at spanwise intervals if necessary. An additional flange 96 may be provided to prevent up-flow interfering with the proper closing of the filaments.

Figure 10A:
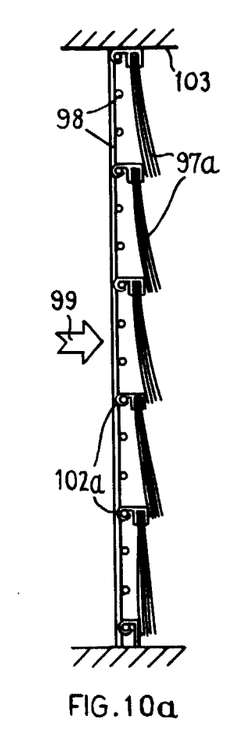
FIGS. 10a–c show three forms of the device arranged to prevent flow reversal.
Figure 10B:
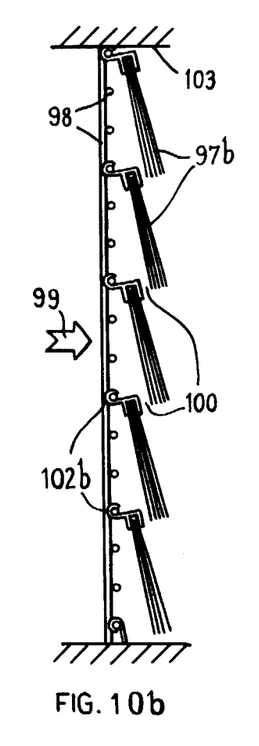
Figure 10C:
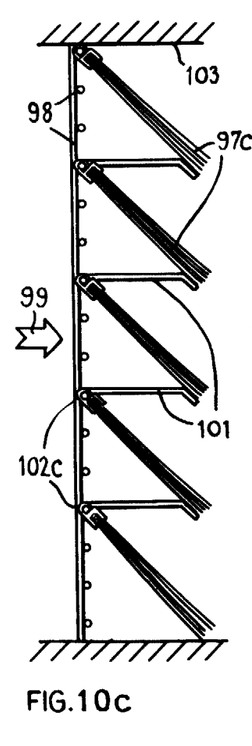

FIGS. 10a-c show three embodiments with arrays 97a-c mounted on stout wire grids 98 and installed in such a manner as to yield to flow approaching from the direction of the broad arrows 99. In the arrangement shown in FIG. 10a the filaments 97a are closed in conditions of zero flow and remain closed against flow in the opposite direction to that of arrow 99, thus the whole device acts as a low pressure non-return valve. To ease the passage of fluid in the permitted direction of the arrows the filaments may be set at somewhat of an angle as in FIG. 10b thus allowing a free space 100 between the bottom of the filaments of one array and the mounting of the array below. Such an arrangement will be acceptable in situations where some back flow can be tolerated. Where this must be reduced the arrangement of 10c may be adopted where flanged members 101 have been added to allow the filaments to stand at a large angle to the direction of flow and at the same time to provide a closing surface for the filaments at zero and for reversed flow. The arrays may be mounted on the wire grids with simple bent clips, or more sophisticated mounting means may be employed.

The whole grid is mounted across a passage, tunnel or duct 103. If the grid is set at an angle to the transverse plane a greater area is presented to the flow so that a greater total aperture area may be provided. If, in a horizontal passage, the grid is maintained in a vertical plane but slanted across the passage in plan at 45° the span of the array is increased by about 41%. Alternatively in a similar passage the grid may be set at right angles to the side walls, but be sloped relative to the bottom and top. If, for example, the top of the grid is angled towards the oncoming flow which is permitted to pass, not only can a greater number of arrays be included but the line of the filaments also tends to fall more in line with the flow. With this arrangement some means for preventing reversed flow from driving into the ends of the arrays may be provided.

Figure 11:
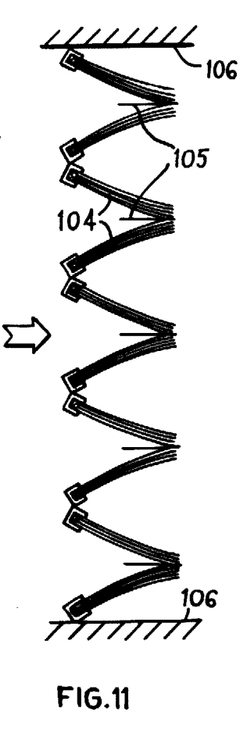
FIG. 11 shows the device arranged as a set of Vees.

In the embodiment of FIG. 11 pairs of arrays 104 are angled into Vees. To prevent the tips of the filaments becoming entangled under the action of reversed flow they may be arranged to close an intervening plates 105 mounted between them. In a preferred embodiment the pairs of arrays are mounted vertically between walls so that the resting filaments of both members of each Vee suffer the same effects of gravitation. FIG. 11 thus is a section in plan whereas FIGS. 10a-c are sections in elevation.

In the foregoing examples and embodiments the geometry of each arrangement has been the same right across the span. If the spanwise geometry changes, further varieties of response to the flow become available.

Figure 12A:
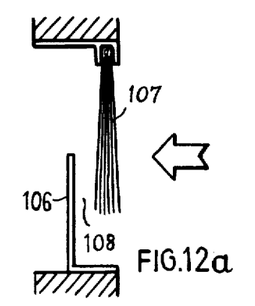
FIGS. 12a–c, 13a–c and 14a–c show three series of cross-sections along the span for arrangements which have varying spanwise response to fluid loading.
Figure 12B:
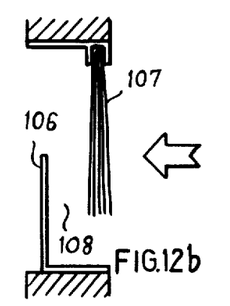
Figure 12C:
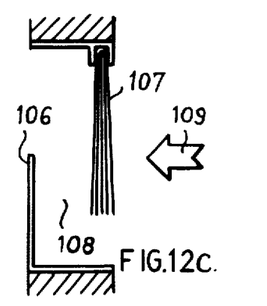

In FIGS. 12a-c three spanwise sections through an array and associated structure are shown, in which the position of the flange 106 is varied relative to the array 107 progressively altering the gap 108 between the back of the filaments and the said flange and hence the area available for fluid movement. The direction of the approach flow in all FIGS. 12, 13 and 14 is shown by the broad arrows 109.

Figure 13A:
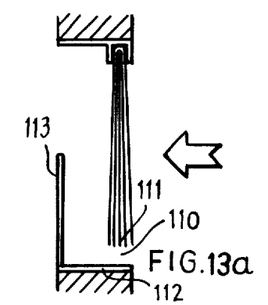
Figure 13B:
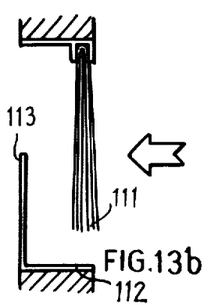
Figure 13C:
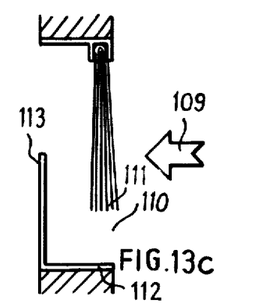
Figure 14A:
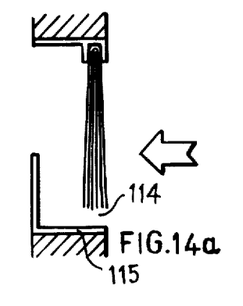
Figures 14B, 14C:
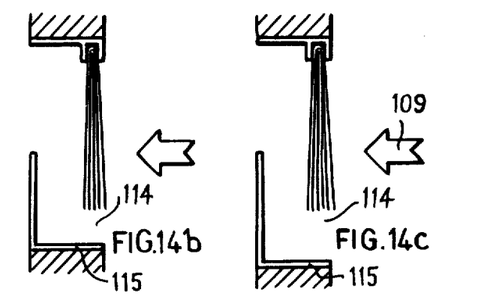

In FIGS. 13a-c the gaps 110 between the tips 111 of the filaments and the structure 112 is varied by reducing the length of the filaments. The position of the flange 113 remains unaltered. In FIGS. 14a-c a similar variation in the gap 114 is brought about by dropping the level of the structure 115. An equivalent arrangement to that of FIGS. 12 may be obtained by mounting the flange 106 as in FIG. 12c and bending it progressively towards the filaments to reduce the effective gap across the span. The significant difference between the arrangements of FIGS. 13 and FIGS. 14 is that in the example of FIGS. 13 the effective stiffness of the filaments increases as their length decreases while the stiffness remains the same for all FIGS. 14.

Such examples as these provide an alternative means for progressively closing the total passage available to the working fluid as the pressure head increases. When the approach flow is uniform across the span they may also be used to control the position at which the strongest flow penetrates the device or, where the approach flow varies across the span, to balance the penetration.

As a result of normal manufacturing processes it is likely that the line of the tips of the filaments will be somewhat irregular unless the ends are carefully trimmed. In some arrangements a slightly ragged finish may be of little importance to the action of the device as, for instance, in the cases of the form shown in FIG. 4a where the operation is almost entirely dependent on pressure changes on the two sides and for the one-way flow screens of FIGS. 10a-c. For the arrangements in which the direct action of the flow on the tips is of importance as in FIG. 4b or the clearance between the tips and the structure is critical as in FIGS. 6a-c or FIGS. 13 and FIGS. 14, it becomes important to shape the tips of the filaments with some care.

Figure 15A:
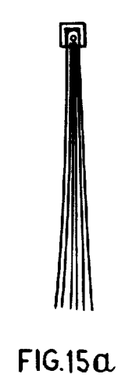
FIGS. 15a–e show various tip forms for the filaments.
Figure 15B:
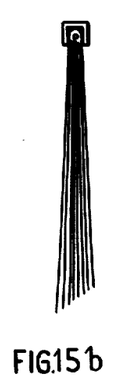
Figure 15C:
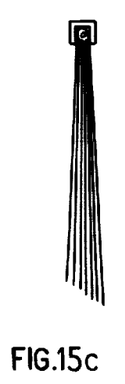
Figure 15D:
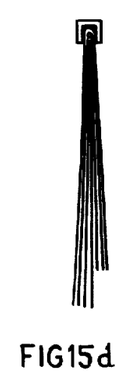
Figure 15E:
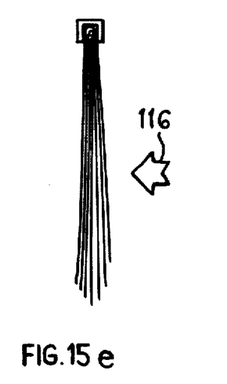

FIGS. 15a-e show five tip forms which are acted upon by fluid from the direction of the broad arrow 116. FIG. 15a shows a neat square trimmed array suitable for general application. Such precise finish is particularly preferable in embodiments such as those of FIGS. 5a and 5b. FIG. 15b also shows a neatly trimmed array but the trim is angled so that the longer filaments are at the downstream side. In this case the tips of the longer filaments will catch the fluid motion more readily and deflect easily with it. FIG. 15c is the reverse of FIG. 15b. The upstream filaments are well protected by the longer downstream ones. FIG. 15d. shows an array formed by folding uniform fibres in an off-centre position to provide filaments of unequal length on each side of the array. This arrangement will respond differentially somewhat similarly to the arrangements if FIGS. 15b and 15c. In practice it may not be easy to trim the shorter filaments as neatly as shown in the figure. FIG. 15e shows an array trimmed or constructed to have the longer filaments in the middle. With this arrangement only about half the array will deflect initially under the direct action of the flow at the tips and the response will thus be more sensitive than that of a square tipped array but it will respond the same in both directions. Tip trims such as these may be incorporated in the preceding examples and embodiments as appropriate.

Figure 16A:
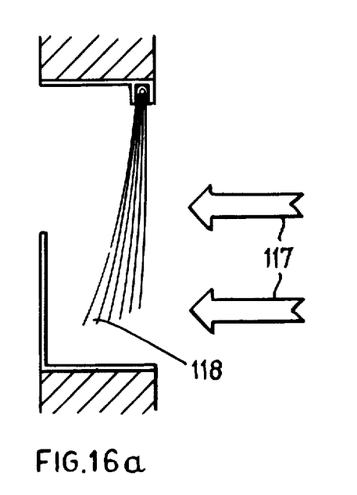
FIGS. 16a–b show examples of the response of different tip forms.
Figure 16B:
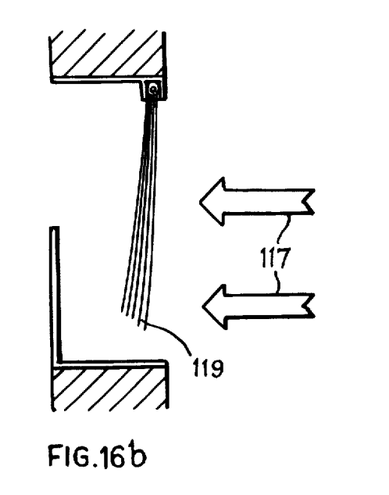

FIGS. 16a and 16b illustrate the response of the trims of FIG. 15b and 15c respectively to the same incident flow 117. In FIG. 16a the longer downstream filaments 118 are readily caught and deflected by the flow, but the screen they provide is very porous. In FIG. 16b the longer upstream filaments 119 press against the shorter and the whole array deflects only slightly but it retains its low porosity.

The size of the device, the material and flexibility of the filaments will depend on the application. In air, for example, filaments of nylon or polypropylene of 0.003 to 0.008 inches diameter may often be suitable and filament length to diameter ratios in the range 250 to 1000 will often be preferred, but other ratios are not excluded. In water or other liquids stiffer constructions will generally be preferred. The range of working temperatures will affect the choice of material and the filament properties.

In many instances the flexure of the filaments will suffice for effective operation of the device, but the use of constructions incorporating deflecting mountings for the arrays to enhance or otherwise modify their action is not excluded. Some arrangements, such as that of FIG. 8c, may incorporate flexure in their spanwise mounting by, for example, being firmly held at one end while the other is left free to twist. Under load the direction of twist will be such as to add to the closing action.

Louvred forms of sufficient spanwise stiffness may be made adjustable and the arrays may be added as fringes to louvres of the conventional type.

Due to its nature the device will remain somewhat porous or permeable when closed. Choice of filaments of appropriate properties and sufficient density of packing can reduce the permeability. Arrangements using mixtures of filaments of different properties may be used, for example, fine filaments packed amongst coarser ones. Special constructions may be used, for instance, the filaments can be slanted in their fixing channel, with the filaments on one side slanted at the opposite angle to those on the other, the whole array remaining broadly co-planar. In such an arrangement the overlying of the filaments will reduce permeability and longer and hence more yielding filaments can be used for a given height of array.

The permeability may also be reduced by limiting the length of filament exposed to pressure differential when in the closed position. With reference to FIG.9a, when the filaments are in the closed position, shown dashed 120, only the part between the roots and the edge of the flange 68 is exposed to the full pressure differential. The addition of a projecting member above the filament roots, shown dashed 121, serves to reduce the exposed length still further. If a strip of impervious but flexible material in incorporated in the array without unduly interfering with its action, permeability may be further reduced. In a preferred arrangement the width of such a strip 122 is just sufficient to reach from the root to the point of closure with the flange 68. The strip may also be attached or adhered to or simply lie along one side, preferably the pressure side of the array. Such a strip may be used with other embodiments.

The illustrative examples of FIGS. 1-6, 12-14 and 16 and the embodiments of FIGS. 7-10 provide a broad picture of the invention which can be applied on its own or added to or incorporated with other devices. It will be appreciated that the invention is of wide application and is not restricted to the examples and embodiments given.

I claim:

1. A fluid flow control arrangement, comprising
   (a) means operable to at least partially define an aperture for the passage of a working fluid, the flow of which is to be controlled;
   (b) an array of resilient filaments, the density of the packing of the filaments being sufficient to prevent the ready passage of the working fluid therebetween; and
   (c) means mounting the array in a manner permitting the filaments resiliently to flex and thus deflect under the action of the working fluid;
   (d) the array being so mountable in relation to the aperture—defining means that, in operation of the control arrangement, the combined deflection of the separate filaments relative to the aperture—defining means under the action of the working fluid alters an effective area of the aperture available for the passage of the working fluid, and thereby controls fluid flow therethrough.

2. An arrangement as claimed in claim 1, wherein the array has one edge zone where the filaments are firmly held by the mounting means, and at least one free end zone, extending along the span of the array, which allows the filaments to deflect, such deflection in combination with the aperture—defining means, in operation, determining said effective area of the aperture.

3. An arrangement as claimed in claim 2, wherein the array is formed from one or more strip brushes having resilient bristle—like filaments of a synthetic plastics material.

4. An arrangement as claimed in claim 3, wherein the array and aperture-defining means are so arranged that said at least one free end zone is spaced from the aperture-defining means in the undeflected condition of the filaments, and said spacing, and therefore said effective area, is decreased progressively with progressive deflection of the filaments caused by an increasing working fluid pressure differential acting across the array.

5. An arrangement as claimed in claim 3, wherein the aperture-defining means includes at least one surface extending generally in the same spanwise direction as said at least one free end zone of the array, and extending into the path along which said at least one free end zone moves during deflection of the filaments, said at least one surface being engaged by the downstream side of the array in said at least one free end zone in a position of the filaments in which they present a resistance to the passage of working fluid through the aperture which is, or approaches, a maximum value.

6. An arrangement as claimed in claim 5, wherein said surface is one of two mutually spaced surfaces which effectively define the sides of a generally U-section channel into which said free end zone of the array extends, said free end zone being engageable selectively with one or other of said surfaces.

7. An arrangement as claimed in claim 6, wherein said surfaces mutually converge, at least in a region remote from, and in a direction away from, the base of the generally U-section channel.

8. An arrangement as claimed in claim 3, wherein the aperture-defining means includes a surface extending generally in the same spanwise direction as said free end zone of the array, and spaced and inclined relative to the path along which said free end zone moves during deflection of the filaments.

9. An arrangement as claimed in claim 3, wherein the array and aperture-defining means are so arranged that said free end zone engages the aperture-defining means in the undeflected condition of the filaments.

10. An arrangement as claimed in claim 9, wherein the aperture-defining means includes a surface extending generally in the same spanwise direction as said free end zone of the array, which is engaged by the tips or upstream side of said free end zone.

11. An arrangement as claimed in claim 10, wherein said surface is one of two mutually spaced surfaces which effectively define the sides of a generally U-section channel, said free end zone being engageable selectively with one or other of said surfaces.

12. An arrangement as claimed in claim 3, wherein the aperture-defining means includes a flange, the array being co-operable with a side face or edge of the flange.

13. An arrangement as claimed in claim 3, including means for adjusting the static relative position of the array and aperture-defining means.

14. An arrangement as claimed in claim 3, including stop means for limiting the deflection of the filaments.

15. An arrangement as claimed in claim 14, wherein said stop means comprises or includes the aperture-defining means.

16. An arrangement as claimed in claim 3, including means to reduce the permeability of the array of filaments to the working fluid, at least when the array is in its position in which the filaments present a resistance to the passage of working fluid through the aperture which is, or approaches, a maximum value.

17. An arrangement as claimed in claim 16, wherein said permeability-reducing means comprises a strip of supple material supported by and deflectable with the zone of the array intermediate said one edge zone and said free end zone of the array.

18. An arrangement as claimed in claim 3, including a plurality of said arrays mutually arranged in parallel with respect to the direction of flow of working fluid through the aperture.

19. An arrangement as claimed in claim 18, wherein one array, or the mounting means therefore, forms the aperture-defining means for a next adjacent array.

20. An arrangement as claimed in claim 3, wherein the geometry in cross-section of the arrangement is not uniform along the span of the array.

21. An arrangement as claimed in claim 3, which is operable as a low pressure control device to maintain a substantially constant flow of air through the aperture within generally predetermined limits, irrespective of normal variations in the differential pressure across the array or arrays.

22. An arrangement according to claim 21, wherein said aperture comprises a ventilating air aperture.

23. An arrangement according to claim 21, wherein said aperture comprises a ventilating air opening of a window.

* * * * *